(12) United States Patent
Yasuda (10) Patent No.: US 6,371,234 B2
(45) Date of Patent: *Apr. 16, 2002

(54) VEHICLE STABILITY CONTROL APPARATUS AND METHOD

(75) Inventor: Sota Yasuda, Isehara (JP)

(73) Assignee: Nissan Motor Co., Ltd., Yokohama (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,879

(22) Filed: Aug. 9, 1999

(30) Foreign Application Priority Data

Aug. 10, 1998 (JP) .......................... 10-226110

(51) Int. Cl.⁷ ................................. B60T 8/56
(52) U.S. Cl. ...................... 180/197; 303/140
(58) Field of Search .................. 180/197; 303/139, 303/140, 146, 147; 701/70, 74, 75, 82–85, 90, 91

(56) References Cited

U.S. PATENT DOCUMENTS

| 5,429,428 A | * 7/1995 | Yasuda ...................... 303/103 |
| 5,431,242 A | * 7/1995 | Iwata ......................... 180/197 |
| 5,593,217 A | * 1/1997 | Schmitt ...................... 303/139 |

* cited by examiner

Primary Examiner—Christopher P. Schwartz
Assistant Examiner—C. T. Bartz
(74) Attorney, Agent, or Firm—Foley & Lardner (57) ABSTRACT

A vehicle stability apparatus and method with an on-off-switch, to prevent the driving road wheel from applying excessive braking force when the traction control apparatus is off. When a selectable switch is selected off, a control unit does not exert the traction control to decrease the engine output power to restrain the driving wheels slip even if driving wheel slip is generating. Then the control unit exerts the yaw moment control apparatus for optimizing vehicle stability to control wheel braking force of respective road wheels, and the control unit compulsory exerts the traction control during generating wheel slip irrespective of the switch.

6 Claims, 7 Drawing Sheets

VEHICLE STABILITY CONTROL APPARATUS AND METHOD

CROSS REFERENCE TO RELATED APPLICATIONS

The entire contents of Japanese application Tokugan Hei 10-226110, with a filing date of Aug. 10, 1998 in Japan, are hereby incorporated by reference.

BACKGROUND OF THE INVENTION

This invention relates to a vehicle stability control apparatus which has a yaw moment control apparatus for optimizing vehicle stability to control wheel braking force of respective road wheels and has a traction control apparatus arranged to restrain a drive wheel slip at least by reducing engine torque.

As one example, Japanese Patent Kokai No. 9-286261 discloses a traction control apparatus that decreases the engine output power to restrain a driving wheel slip, by closing a second throttle valve operated by a DC motor and provided in series to a first accelerator connected with an accelerator pedal so that the opening degree of the first throttle valve is determined by the depression degree of the accelerator pedal, and by cutting off the fuel supply to one or more cylinders of the engine. Furthermore, if the driving wheel slip cannot be restrained by decreasing the engine output power, the traction control apparatus applies the brakes to the driving wheel.

This conventional apparatus is intended to decrease the engine output power to restrain the drive wheel slip in the first place, but if the wheel slip is not restrained by it, then the traction control apparatus applies the brakes to the drive wheel.

Such conventional traction control apparatus can have a selector switch to turn it on or off depending on the situation in which a traction wheel is stuck in a muddy place or the like.

As another example, Japanese Patent Kokai No. 9-2316 discloses a yaw moment control apparatus which makes the vehicle's behavior more desirable by operating the braking force on the inside brake of the vehicle or on the outside brake of the vehicle during cornering.

BRIEF SUMMARY OF THE INVENTION

It is an object of the present invention to provide a vehicle stability control apparatus and method which has a yaw moment control apparatus and has a traction control apparatus, which can prevent the traction road wheel from applying excessive braking force when the traction control apparatus is switched off.

According to one aspect of the present invention, there is provided a vehicle stability control apparatus which includes an engine and at least one drive wheel driven by the engine, the apparatus comprising: a wheel speed sensor to detect a wheel speed of the at least one driving wheel; an engine power control apparatus to control the engine output power in response to a first control signal; a braking force applying apparatus to apply braking force to at least the driving wheel in response to a second control signal; a vehicle behavior detector to detect vehicle behavior; a selectable switch to output an activation signal which places the engine power control apparatus in active state and an inhibition signal which place the engine power control apparatus in inactive state according to the selection by the driver; and a control unit operatively coupled with said wheel speed sensor, said engine power control apparatus, said braking force applying apparatus, said vehicle behavior detector, and selectable switch, wherein said control unit calculates a vehicle velocity from the wheel speed detected by the wheel speed sensor; the control unit calculates a slip of the at least one drive wheel in response to the wheel speed and the vehicle velocity; said control unit applies first control signal to said engine power control apparatus to decrease the engine output power according to the slip of the at least one drive wheel when said selectable switch is outputting the activation signal; said control unit applies the second control signal to said braking force applying apparatus to according to the vehicle behavior adjust the braking pressure to have the vehicle generate a moment in the stable direction; and said control unit applies said first control signal to the engine power control apparatus irrespective of a state of the selectable switch when the second control signal is applied to said the braking force applying a apparatus. According to the invention, the vehicle stability apparatus and method with an on-off-switch prevent the driving road wheel from applying excessive braking force when the traction control apparatus is off.

There is also provided a vehicle stability control apparatus which includes an engine and at least one driving wheel driven by the engine, the apparatus comprising: a slip sensor apparatus for detecting a slip of the driving wheel; a traction control apparatus for decreasing the engine output power according to the detected slip of the driving wheel; a selectable switch for switching the traction control apparatus on and off; a vehicle behavior detection apparatus for detecting vehicle behavior; a braking force applying apparatus for applying braking force to at least the driving wheel in response to a control signal; and a control unit operatively coupled with the vehicle behavior detection apparatus, wherein said control unit applies a control signal to adjust vehicle behavior to a determined value, and said control unit setting the traction control apparatus ON irrespective of a state of the selectable switch based on the control signal.

There is also provided a vehicle stability control apparatus which includes an engine and at least one driving wheel driven by the engine, the apparatus comprising: a slip sensor apparatus for detecting a slip of the driving wheel; a traction control apparatus for decreasing the engine output power according to the detected slip of the driving wheel; a selectable switch for switching the traction control apparatus on and off; a vehicle behavior detection apparatus for detecting vehicle behavior; a braking force applying apparatus for applying braking force to at least the driving wheel in response to a control signal; and a control unit operatively coupled with the vehicle behavior detection apparatus, wherein said control unit applies a control signal to adjust vehicle behavior to a determined value, and said control unit setting said selectable switch ON when adjusting the vehicle behavior based on the control signal.

DETAILED DESCRIPTION OF THE PREFERRED EMBODIMENTS

Figure 1:
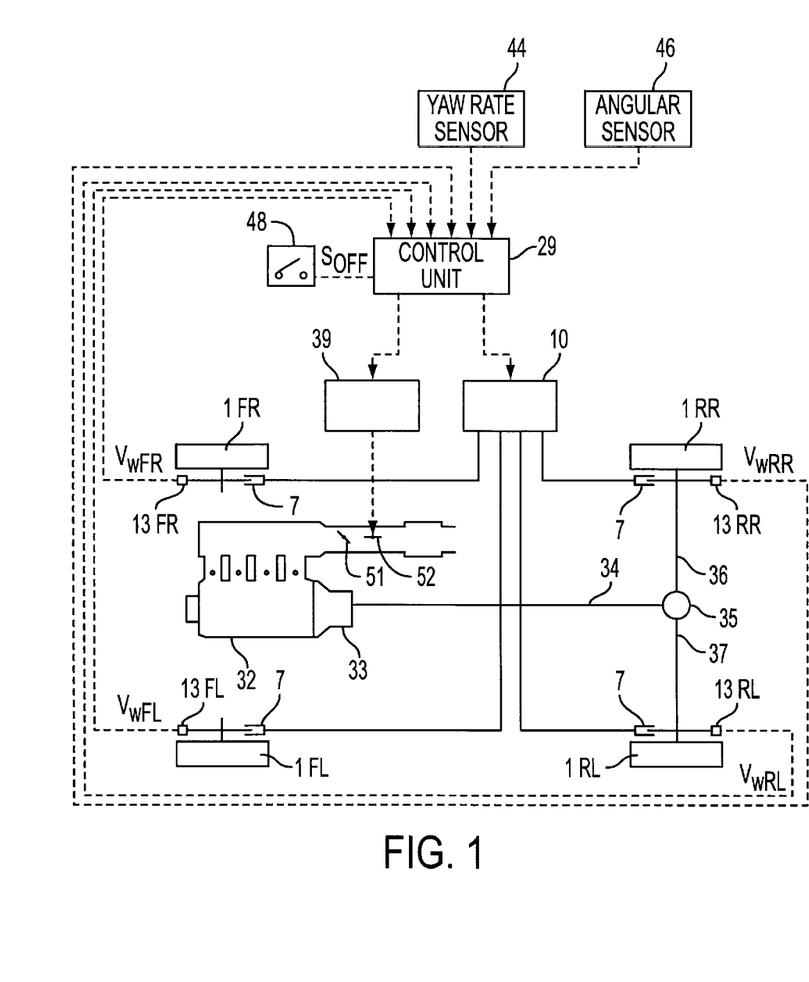
FIG. 1 is a schematic view showing a vehicle equipped with a traction control apparatus and a yaw moment control apparatus according to an embodiment of the present invention.

FIG. 1 shows component parts employed in illustrated embodiments of the present invention.

This invention will be described in connection with a rear-drive type automotive vehicle supported on a pair of front road wheels and a pair of rear road wheels. Front wheels 1FL and 1FR are provided as non-driving wheels, and rear wheels 1RL and 1RR are provided as driving wheels, and a drive is transmitted from an engine 32 to the rear road wheels 1RL, 1RR through an automatic transmission 33, a propeller shaft 34 and a differential gear 35.

The front road wheels 1FL, 1FR and the rear road wheels 1RL, 1RR are associated with respective disc brakes 7 which are placed for application of brakes to the respective wheels. These disc brakes 7 generate braking force by braking pressure provided from and controlled by the braking force control apparatus 10.

Wheel speed sensors 13FL, 13FR are provided for off and right front wheels 1FL, 1FR. Wheel sensors 13RL, 13RR are provided for left and right rear wheels 1RL, 1RR. A yaw rate sensor 44 is provided to detect the yaw rate of the vehicle. Angular sensor 46 is provided to detect angular positioning θ of steering wheel.

A selectable switch 48, which selects between operating conditions and non-operating conditions of the traction control, is installed near the driver's seat. This selectable switch 48 outputs a switch signal $S_{OFF}$ when the driver selects condition which activates the traction control, the switch signal $S_{OFF}$ is "ON", when the driver selects condition which does not activate the traction control, $S_{OFF}$ is "OFF".

A stability control unit 29 receives wheel speed signals from the wheel speed sensor 13FL~13RR, detects an occurrence of slip in accordance with a wheel speed difference between a driving wheel speed and a non-drive wheel speed, and produces driving force reduction request signals when the slip occurs. A driving force reduction request signals is sent to an actuating system 39 for actuating the second throttle valve 52.

The actuating system 39 is associated with an engine 32 for controlling the power of the engine. The first throttle valve 51 is connected with an accelerator pedal so that the opening degree of the first throttle valve 51 is determined by the depression degree of the accelerator pedal. A second throttle valve 52 is further provided in the intake passage 53 of the engine. The second throttle valve 52 of this example is disposed on the upstream side of the first throttle valve. The second throttle valve 52 is a normally open-valve.

Figure 2:
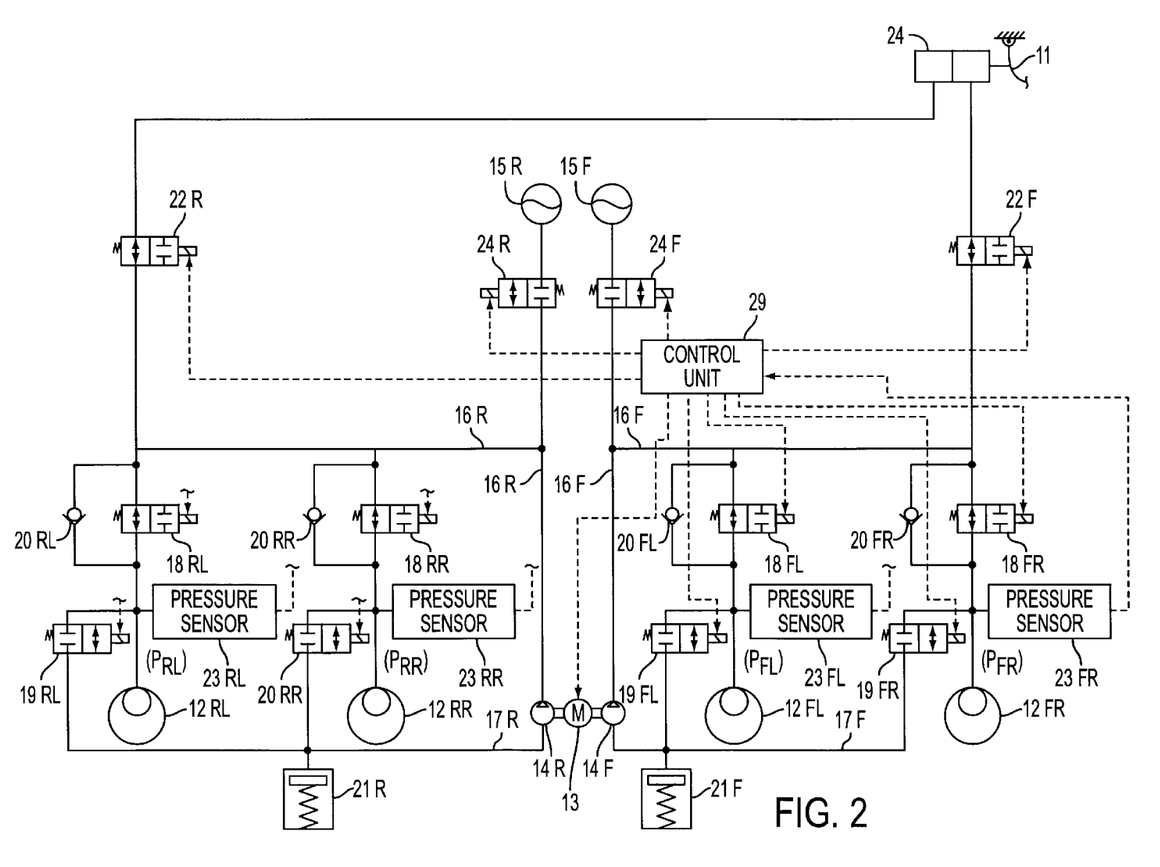
FIG. 2 is a schematic diagram showing one embodiment of a braking force control apparatus according to the present invention.

FIG. 2 shows a schematic diagram showing one embodiment of a braking force control apparatus according to the embodiment of the present invention.

A brake pedal 11 is operated by the operator and connected to a master-cylinder 24 that has two cells. One of the cells is connected to wheel cylinders 12FL, 12FR through a conduit to provide an operator's demand for braking pressure. The other one is connected with wheel cylinders 12RL, 12RR through a conduit to provide an operator's demand for braking pressure. A motor 13 is driven on a command from the control unit to operate front and rear road wheel pumps 14F, 14R so as to force the braking fluid to respective accumulators 15F, 15R.

The front road wheel pump 14F has an exhaust or discharge port connected through a conduit 16F to pressure increasing valves 18FL, 18FR and hence to the respective wheel cylinders 12FL, 12FR. A check valve 20FL is connected in parallel with the pressure increasing valve 18FL to permit flow only toward the 16F while preventing back flow. A check valve 20FR is connected in parallel with the pressure increasing valve 18FR to permit flow only towards the 16F while preventing back flow.

The pressure increasing valves 18FL and 18FR, which are substantially the same in structure, are in the form of solenoid valves operable, on a control signal fed thereto from the control unit 29, to occupy one of two positions. The first or open position, illustrated in FIG. 2, is occupied in the absence of the control signal to increase the braking fluid pressure $P_{FL}, P_{FR}$ furnished to the corresponding one of the wheel cylinders 12FL and 12FR. The second or closed position is encountered in the presence of the control signal to hold the braking fluid pressure in the corresponding wheel cylinder. The front road wheel pump 14F has an intake or suction port connected through a conduit 17F to pressure reducing valves 19FL and 19FR and hence to the respective wheel cylinders 12FL and 12FR.

The pressure reducing valves 19FL and 19FR, which are substantially the same in structure, are in the form of solenoid valves operable, on a control signal fed thereto from the control unit 29, to occupy one of two positions. The first or closed position, illustrated in FIG. 2, is occupied in the absence of the control signal to hold the braking fluid pressure $P_{FL}$, $P_{FR}$ in the corresponding one of the wheel cylinders 12FL and 12FR. The second or open position is encountered in the presence of the control signal to reduce the braking fluid pressure in the corresponding wheel cylinder.

Similarly, the rear road wheel pump 14R has an exhaust or discharge port connected through a conduit 16R to pressure increasing valves 18RL and 18RR and hence to the respective wheel cylinders 12RL and 12RR. A check valve 20RL is connected in parallel with the pressure increasing valve 18RL to permit flow only towards the 16F while preventing back flow. A check valve 20RR is connected in parallel with the pressure increasing in parallel with the pressure increasing valve 18RR to permit flow only towards the 16R while preventing back flow.

The pressure increasing valves 18RL and 18RR, which are substantially the same in structure, are in the form of solenoid valves operable, on a control signal fed thereto from the control unit 29, to occupy one of two positions. The first or open position, illustrated in FIG. 2, is occupied in the absence of the control signal to increase the braking fluid pressure $P_{RL}$, $P_{RR}$ furnished to the corresponding one of the wheel cylinders 12RL and 12RR. The second or closed position is encountered in the presence of the control signal to hold the braking fluid pressure in the corresponding wheel cylinder.

The rear road wheel pump 14R has an intake or suction port connected through a conduit 17R to pressure reducing valves 19RL and 19RR and hence to the respective wheel cylinders 12RL and 12RR. The pressure reducing valves 19RL and 19RR, which are substantially the same in structure, are in the form of solenoid valves operable, on a control signal fed thereto from the control unit 29, to occupy one of two positions.

The first or closed position, illustrated in FIG. 2, is occupied in the absence of the control signal to hold the braking fluid pressure PFL, PRR in the corresponding one of the wheel cylinders 12RL and 12RR. The second or open position is encountered in the presence of the control signal to reduce the braking fluid pressure in the corresponding wheel cylinder. A reservoir 21R is connected to the conduit 17R. The reservoir 21R acts as an accumulator for accumulating the braking fluid pressure discharged through the pressure reducing valves 29FL and 29FR. A reservoir 21R is connected to the conduit 17R. The reservoir 21R acts as an accumulator for accumulating the braking fluid pressure discharged through the pressure reducing valves 19RL and 19RR.

A cutting valve 22F is installed between the master-cylinder 24 and the conduit 16F, and a cutting valve 24F is installed between the accumulator 15F and the conduit 16F. Similarly a cutting valve 22R is installed between the master-cylinder 24 and the conduit 16R, and a cutting valve 24R is installed between the accumulator 15R and the conduit 16R.

The cutting valves 22F, 22R, which are substantially the same in structure, are in the form of solenoid valves operable, on a control signal fed thereto from the control unit 29, to occupy one of two positions. The first or open position, illustrated in FIG. 2, is occupied in the absence of the control signal to let the braking fluid flow. The second or closed position is encountered in the presence of the control signal to cut off the conduits. The cutting valves 24F, 24R, which are substantially the same in structure, are in the form of solenoid valves operable, on a control signal fed thereto from the control unit 29, to occupy one of two positions. The first or closed position, illustrated in FIG. 2, is occupied in the absence of the control signal to keep the pressure inside of the accumulators high. The second or opened position is encountered in the presence of the control signal to supply the high pressure braking fluid for braking pressure.

The control signals applied to the respective solenoid valves 18FL, 18FR, 18RL, 18RR, 19FL, 19FR, 19RL, 19RR, 22F, 22R, 24F and 24R are repetitively determined from calculations performed by the control unit 29.

Figure 3:
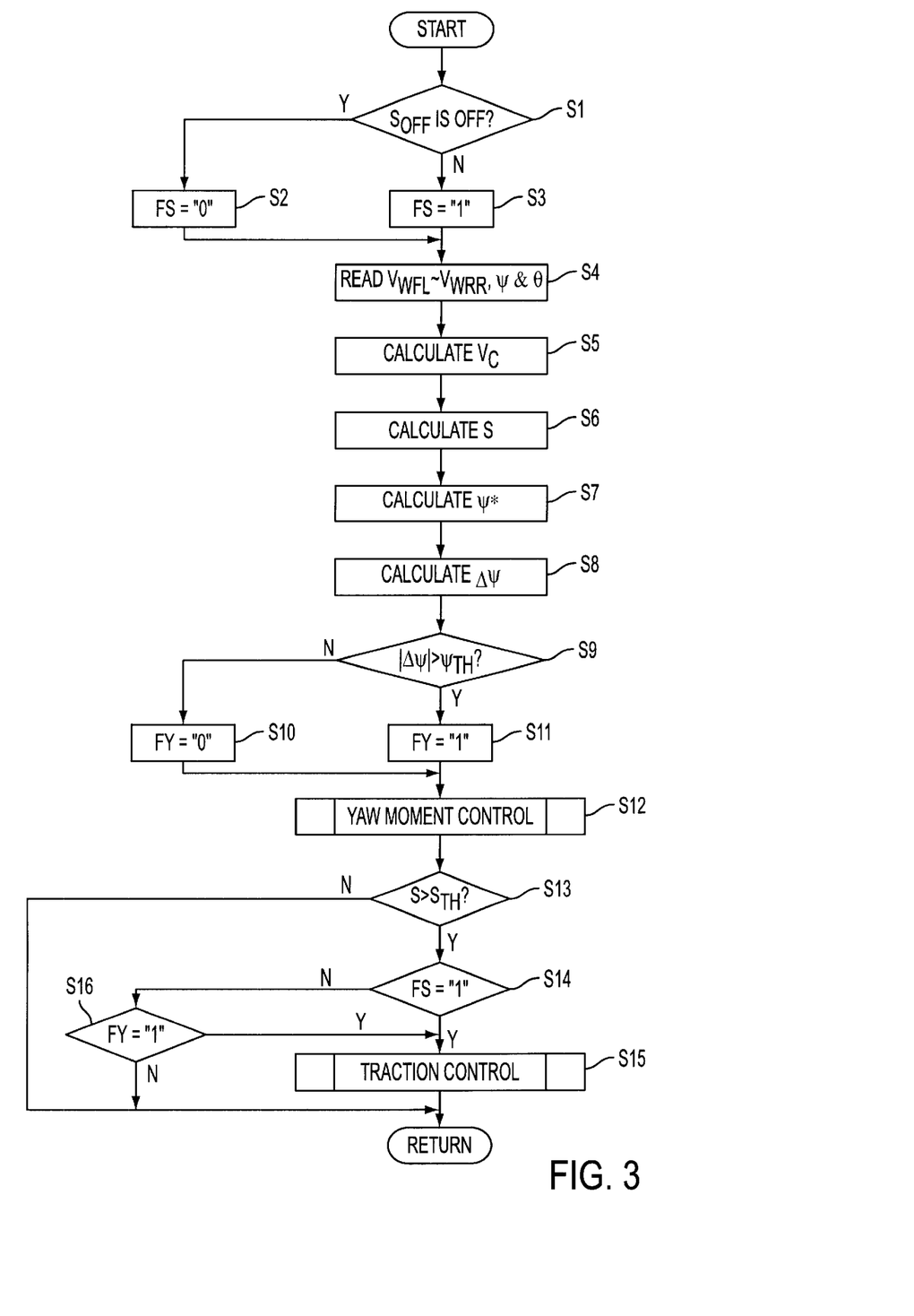
FIG. 3 is a flow chart illustrating the programming of the digital computer as it is used for braking force control.

FIG. 3 is a flow chart illustrating the programming of the digital computer as it is used for the vehicle stability control apparatus that combines the traction control unit and the braking force control unit.

At the step S1, a determination is made as to whether or not the switch $S_{OF}$ is OFF. If the answer to this question is "yes", i.e. switch $S_{OFF}$ is OFF, the control unit proceeds to the step S2.

At the step S2, the control unit makes that flag FS is "0", and then proceeds to the step S4.

Otherwise, if the answer to this question is "no" at the step S1, i.e. switch $S_{OFF}$ is ON, the control unit proceeds to the step S3.

At the step S3, the control unit makes that flag FS is "1", and then proceeds to the step S4.

At the step S4, wheels speed $V_{WFL}$, $V_{WFR}$, $V_{WRL}$, $V_{WRR}$ yaw rate $\psi$, and angular positioning $\theta$ of steering wheel are read into the computer memory.

At the step S5, vehicle speed Vc is calculated from wheels speed $V_{WFL}$, $V_{WFR}$, $V_{WRL}$ and $V_{WRR}$ by calculating the average of $V_{WFL}$, $V_{WFR}$ which are speeds of non-driving wheels while the vehicle is not braked, or by calculating selecting the highest speed of all of the wheels while the vehicle is braked.

At the step S6, slip quantity S of the driving wheels is calculated as shown in equation (1)

$$S=(V_{WFL}+V_{WFR}-V_{WRL}-V_{WRR})/2 \tag{1}$$

At the step S7, desirable yaw rate is calculated by the following equation (2) and equation (3) from the yaw rate $\psi$, and angular $\theta$ of steering wheel respectively.

$$\psi^*=Vc/R \tag{2}$$

$$R=Ks \ L/\tan(\theta/N) \tag{3}$$

where R is the radius of the cornering, L is the gear ratio of steering and Ks is the stability factor. Stability factor Ks is a coefficient that corresponds to a vehicle's driving stability during cornering. Generally, a vehicle develops a tendency to understeer as the stability factor is greater.

At the step S8, the yaw rate difference $\Delta\psi$ is calculated by subtracting the yaw rate from a desirable yaw rate.

At the step S9, the traction control unit compares the absolute value $|\Delta\psi|$ of the yaw rate difference with a predetermined yaw rate threshold $\psi TH$. If $|\Delta\psi| \leq \psi TH$, then the control unit judges that the yaw rate difference is so small that the vehicle does not need to be exerted yaw moment control, and proceeds to the step S10.

At the step S10, the control unit makes that flag FY is "0", and then proceeds to the step S13.

At the step S9, if $|\Delta\psi|>\psi TH$, then the control unit judges that the yaw rate difference is so great that the vehicle should be exerted yaw moment control, and proceeds to the step S11.

At the step S11, the control unit makes that flag FY is "1", and then proceeds to the step S12.

At the step S12, the control unit calculates a desirable wheel cylinder pressure $P_{WC}{}^*_{FL} \sim P_{WC}{}^*_{RR}$ of the respective wheel cylinders according to the yaw rate difference $\Delta\psi$. While the control unit drives the motor 13 to operate front and rear road wheel pumps 14F, 14R and changes the position of the cutting valve 22F from opened position to closed position. Similarly the cutting valves 22R, 24F and 24R are changed from an opened position to a closed position. Furthermore the pressure increasing valves 18FL, 18FR, 18RL and 18RR are changed from the opened position to the closed position. Consequently the pressure inside of the conduits 16F, 16R is kept high pressure for supplying the braking pressure to wheel cylinders. The control unit 29 outputs the increase and decrease signals to increase or decrease the wheels cylinder pressure according to the difference of desirable wheel cylinder and the braking fluid pressure in the corresponding wheel cylinder. At the step S13, the control unit judges whether or not the slip quantity S calculated at the step S6 is greater than a predetermined slip quantity threshold STH. If $S \leq STH$, then the control unit judges that the slip quantity is so small that the vehicle does not need to be exerted traction control, and terminates this routine. If $S>STH$, then the a predetermined slip quantity threshold STH judges that the slip quantity is so great that the vehicle should be exerted traction control, and proceeds to the step S14.

At the step S14, the control unit judges whether or not the switch flag FS is set as "1". If switch flag FS is set to "1", the traction control proceeds to the step S15.

At the step S15, the control unit calculates a deviation $\epsilon$ of the calculated actual slip quantity S from a predetermined slip quantity threshold STH for optimum driving performance ($\epsilon$=S−STH), and further calculates a desired second throttle valve closed degree T from the deviation $\epsilon$ according to a predetermined control law. In this example, the desired second throttle valve closed degree TH is determined according to a PID control law, and given by the following equation;

$$TH = KP \cdot \epsilon + KI \cdot \int \epsilon \, dt + KD \cdot d\epsilon/dt \quad (4)$$

Where KP is the proportional gain of the proportional control action, KI is an integral gain of the integral control action, and KD is a derivative gain of the derivative control action.

At the step S15, if the switch flag FS is set to "1", the control proceeds to the step S16.

At the step S16, the control unit judges whether or not the switch flag FY is set as "1". If the switch flag FS is set as "1", the control proceeds to the above-mentioned step S15, and if the switch flag FY is set as "0", the control terminates this routine.

In this example, the steps S7~S12 correspond to the yaw moment control means, the steps S6~S15 correspond to the traction control unit, and the steps S14~S16 correspond to the compulsion exert unit.

For example, when driving straight ahead on a high coefficient of friction road like a dry-paved road with the switch signal $S_{OFF}$="ON" to activate the traction control, wheel slip does not generate on the rear wheels 1RL, 1RR.

Therefore, slip quantity S calculated at the step S6 becomes nearly zero and the desirable yaw rate calculated at the step S7 becomes nearly zero.

On this condition, yaw rate $\psi$ sensed at the yaw rate sensor 16 also becomes nearly zero. Therefore, the yaw rate difference $\Delta\psi$ calculated at the step S8 becomes nearly zero and is less than predetermined yaw rate threshold $\psi$TH. The control unit judges that the yaw moment control is unnecessary for the vehicle and does not exert the yaw moment control at the step S12. The control unit judges that the traction control is unnecessary for the vehicle and terminates without exerting the traction control at the S15 because the slip quantity is nearly zero and is less than the slip quantity threshold STH.

For example, after this condition, the vehicle is regarded as turning in a right direction while accelerating, with wheel slip, and over steering.

Yaw rate $\psi$ becomes larger than desirable yaw rate $\psi^*$, and the absolute value $|\Delta\psi|$ of the yaw rate difference exceeds a predetermined yaw rate threshold $\psi$TH.

Accordingly, the traction control unit proceeds from the step S9 to the step S11, makes that flag FY is "1", and then proceeds to the step S12.

At the step S12, the control unit calculates a desirable wheel cylinder pressure $P_{WC}^*{}_{FL}$~$P_{WC}^*{}_{RR}$ of the respective wheel cylinders according to the yaw rate difference $\Delta\psi$. While the control unit drives the motor 13 to operate the front and rear road wheel pumps 14F, 14R and changes the position of the cutting valve 22F from opened position to closed position. Similarly the cutting valves 22R, 24F and 24R are changed from opened position to closed position. Furthermore, the pressure increasing valves 18FL, 18FR, 18RL and 18RR are changed from opened position to closed position. Consequently the pressure inside of the conduits 16F, 16R is kept high for supplying the braking pressure to wheel cylinders. The control unit 29 outputs the increase and decrease signals to the pressure increasing valves 18FL, 18FR, 18RL and 18RR, and the pressure decreasing valves 19FL, 19FR, 19RL and 19RR to increase or decrease the wheels cylinder pressure according to the difference of desirable wheel cylinder and the braking fluid pressure in the corresponding wheel cylinder.

The braking force produced on the outside wheel at cornering and increased according to the pressure of the wheel cylinder of the disc brake restrains the vehicle's over steer tendency and ensures the vehicle stability.

On the other hand, when rear wheels 1RL, 1RR are slipping, the slip quantity S is larger than slip quantity threshold STH, so the traction control unit proceeds from the step S13 to the step S14. Thereafter the traction control unit proceeds to the step S15 because the switch flag FS is set to "1". At the step S15, the control unit calculates the desirable engine torque to restrain the drive wheel slip, and outputs the second throttle valve open degree indicating signal TH to the engine power control module 9.

Next, when the driver turns the selectable switch 48 and the switch signal $S_{OFF}$="OFF" is outputted to be inactivate the traction control, the driving wheel slip is not restrained by a decrease in the engine output power. As described in connection with the illustrated embodiments, however, when the flow chart showed in the FIG. 3 is executed, the switch flag FS is set as "0" at the step S2. The yaw moment control is executed likewise at the step S12, and the control unit calculates a desirable wheel cylinder pressure $P_{WC}^*{}_{FL}$~$P_{WC}^*{}_{RR}$ of the respective wheel cylinders according to the yaw rate difference $\Delta\psi$, and outputs the increase and decrease signals to the braking force control apparatus to increase or decrease the wheels cylinder pressure according to the difference of desirable wheel cylinder and the braking fluid pressure in the corresponding wheel cylinder.

On the other hand, the traction control unit proceeds from the step S13 to the step S14 because the slip quantity S is larger than slip quantity threshold STH, the control unit proceeds from the step S14 to the step S16 because the switch flag FS is reset to "0", and the control unit forcibly proceeds from the step S16 to the step S15 because the flag FY is set to "1".

Therefore, the drive wheel slip is restrained by the traction control according to slip quantity S, and at the step S12 the control unit exerts necessary braking force on the traction road wheel so as to set the vehicle's behavior with a desirable behavior.

Figure 4A:
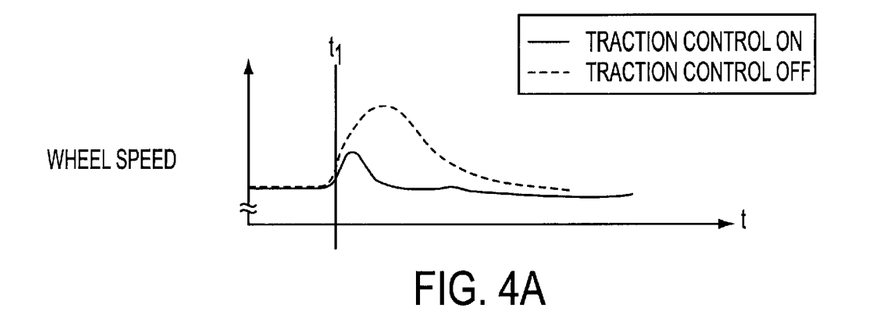
FIG. 4A is a time chart showing the speed of a drive wheel of the vehicle according to an embodiment of the present invention.
Figure 4B:
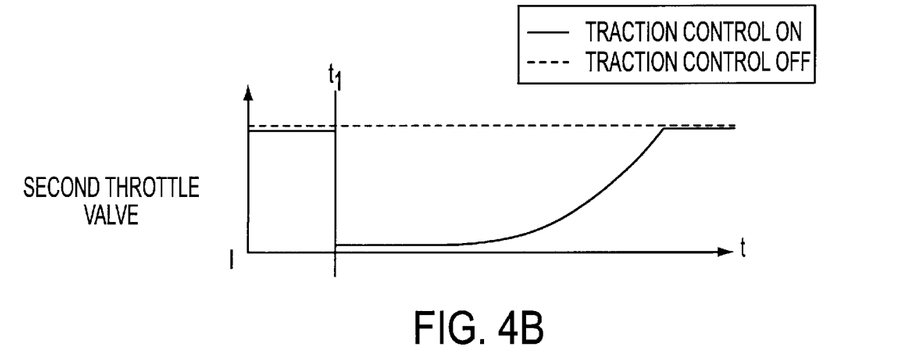
FIG. 4B is a time chart showing the movement of the second throttle valve.

When the yaw moment apparatus is exerted with the traction control apparatus not being under operating conditions by selectable switch 48, the second throttle valve is kept fully open as described with a broken line in FIG. 4b in spite of generating wheel slip at a point of time t1 as described with a broken line in FIG. 4a.

Figure 4C:
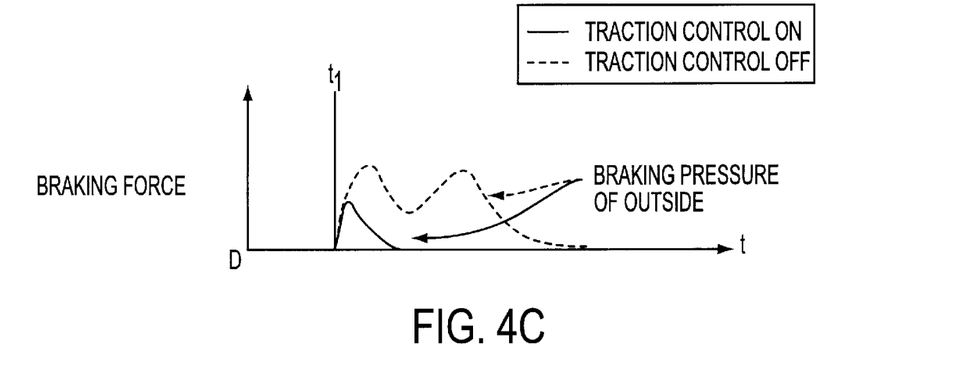
FIG. 4C is a time chart showing the braking pressure (braking force) of the outside brake of the vehicle during cornering.

Because wheel slip is increased without restraint by the traction control, the control unit must apply excessive braking force to accommodate the amount of the engine output power, which should be decreased by the traction control apparatus as described by a broken line in FIG. 4c.

According to the present invention, even if the wheel slip generates at a point of time t1, the second throttle valve is closed until nearly zero as described a solid line in FIG. 4b, and as a consequence of decreased engine power, the wheel slip is restrained as described in FIG. 4a. As a consequence, the control apparatus only has to apply the least breaking force on the driving wheels as described in FIG. 4c.

Furthermore, the control apparatus has an advantage of applying the least breaking force on the disc brake of driving wheels and of improving the durability of the disc brakes.

If the absolute value $|\Delta\psi|$ of the yaw rate difference $\Delta\psi$ becomes less than the predetermined yaw rate threshold ψTH according to the yaw moment control, the traction control proceeds from the step S9 to the step S10 and flag FY is reset to "0". As the traction control unit terminates this routine without proceeding to the step S15 even if the traction control is exerted, the traction control is not under operating conditions, and the control unit can stop the undesirable traction control of the driver as soon as possible.

Figure 5:
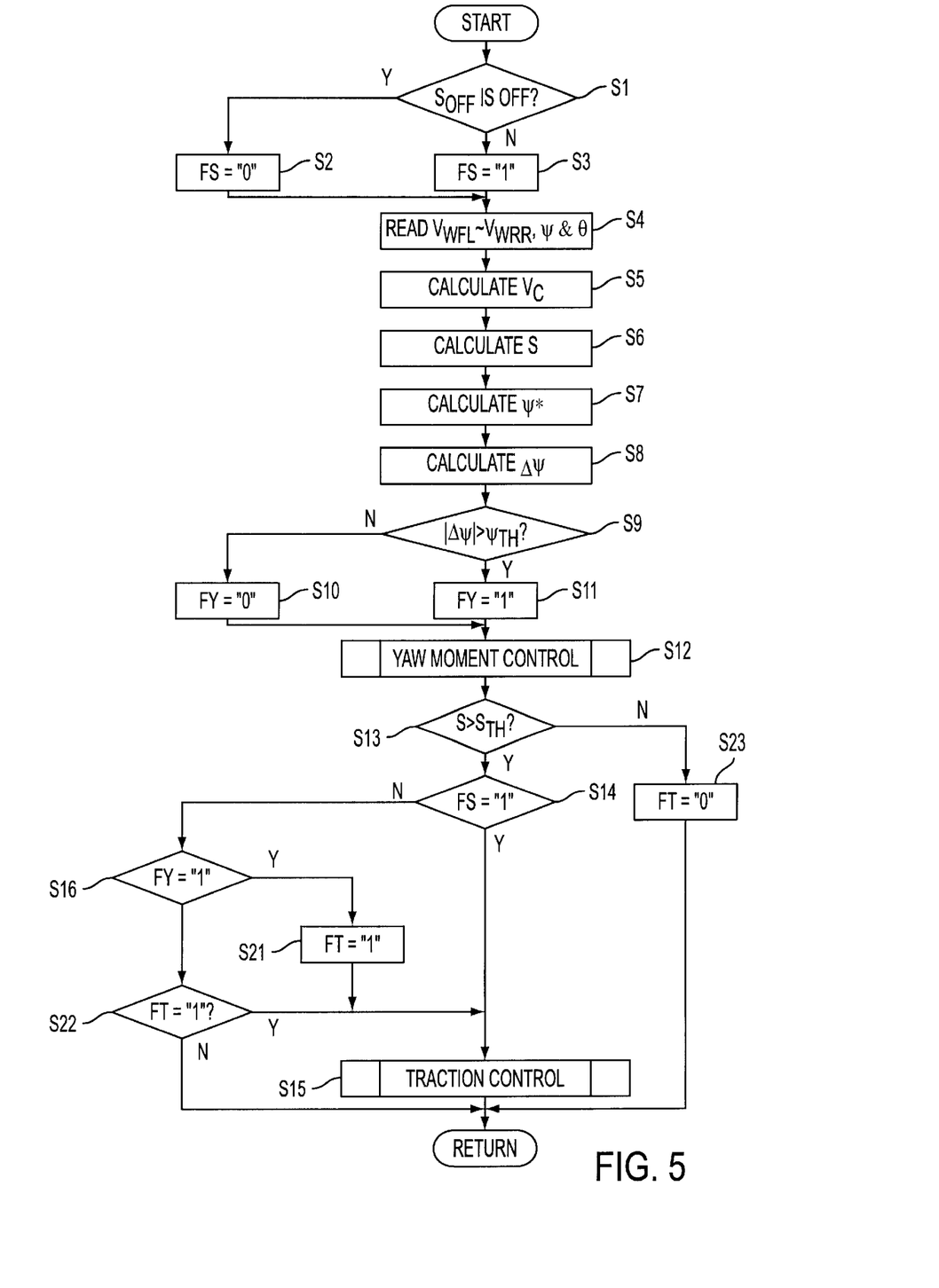
FIG. 5 is a flow chart illustrating the programming of the digital computer as it is used for braking force control of another preferred embodiment of the present invention.

FIG. 5 shows a second embodiment of the present invention. In this embodiment, the control unit judges whether the traction control is being exerted or not at the moment the yaw moment control is finished after forcefully exerting traction control during the exerting of the yaw moment control, and if the traction control is exerted, the control unit continuously exerts the traction control until wheel slip has been restrained.

This embodiment is substantially similar to the first embodiment of FIG. 3 except the addition of the steps S21, S22 and S23. That is, the control unit proceeds from the step S16 to the step S21 when the flag FY is set as "1" at the step S16. At the step S21, the control unit sets the flag FT to "1", which shows that the control unit forcefully starts the traction control, and proceeds to the step S15. When the flag FY is set as "0" at the step S16, the control unit proceeds to the step S22 and judges whether or not the flag FT is set to "1". If the flag FT is set to "1", the control unit proceeds to the step S15, and if the flag FT is set to "0", the control unit terminates this routine. And when the result of the step S13 is S≦STH, the control unit resets the flag to "0", and terminates this routine.

In this embodiment, when the vehicle is regarded as turning in a right direction while accelerating, incurring wheel slip, and becoming in over steer with switch off as the above-mentioned embodiment, the control unit sets the flag FY to "1" at the step S11 and exerts the yaw rate control. At the step S16 through the steps S13, S14, the control unit proceeds to the step S21 because the flag FY is set to "1". At the step S21, the control unit proceed to the step S15 and exerts the traction control after sets the flag FT is set to "1".

After that, the control unit proceeds from the step S9 to the step S10 according to the convergence of yaw rate difference Δψ and resets the flag FY to "0". If wheel slip is generating on the rear wheels which are the driving wheels, the control unit proceeds to the step S16 through the steps S13, S14, and proceeds to the step S22 because the flag FY is set to "0". At the step S22, the control unit proceeds to the step S15 because the flag FT is set to "1", and exerts the yaw moment control.

After that, wheel slip quantity S is under slip quantity threshold STH due to the convergence of wheel slip, and the control unit proceeds from the step S13 to the step S23. At the step S23, the control unit resets the flag to "0" and terminates the routine without proceeding to the step S15, and the traction control is finished.

When wheel slip generates on the rear wheels which are the driving wheels on the condition such as acceleration of the vehicle or low friction road like an icy road, a rain-dampened road or the like, the control unit proceeds to the step S16 through the steps S13, S14. As the flag FY is set to "0" at the step S16, the control unit proceeds to the step S22, and as the flag FT is also set to "0", the control unit terminates the routine without proceeding to the step S15. So the traction control is not exerted as the drivers intend.

Otherwise, when the yaw rate control is exerting, the control proceeds from the step S13 to the step S23, and the traction control is terminated as the flag is reset to "0".

In this embodiment, when the traction control is continuously being exerted as non-convergence of wheel slip when the yaw rate control is terminated, the control unit returns from an exerting condition to a non-exerting condition until the traction control is terminated. Because the traction control is stopped after the vehicle behavior stabilizes, this embodiment can let the vehicle stability improve more than terminating the traction control while the wheel slip is generating.

Figure 6:
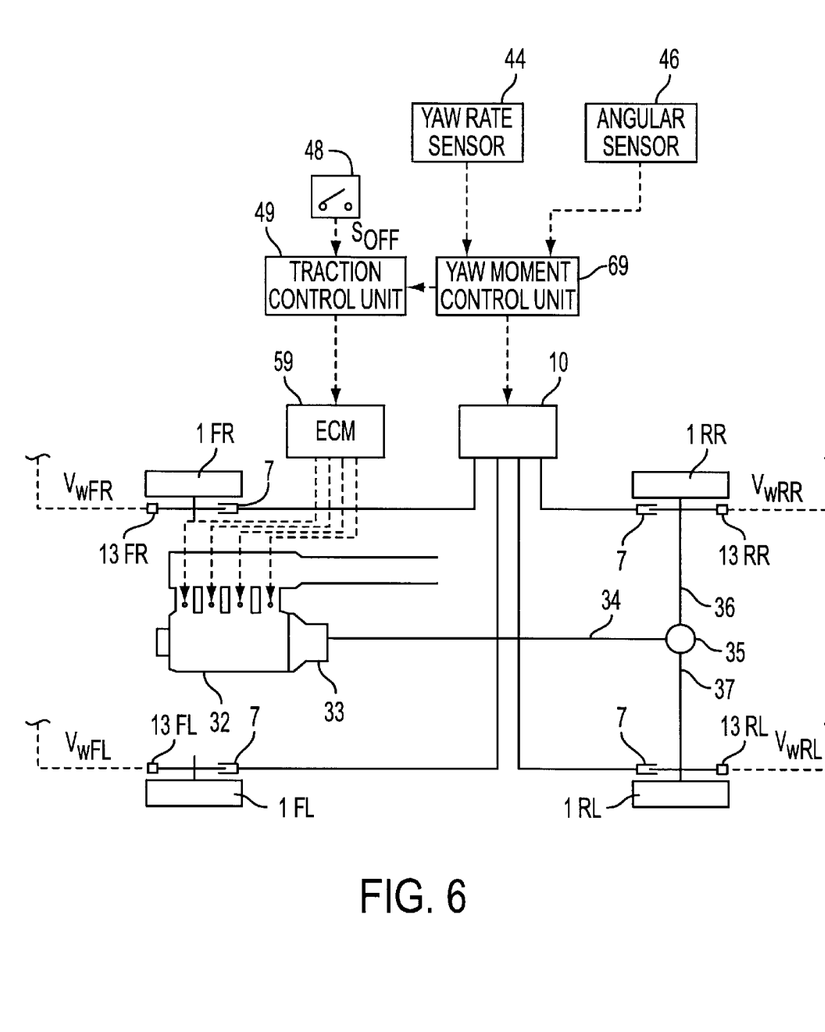
FIG. 6 is a schematic view showing a vehicle equipped with a traction control apparatus and a yaw moment control apparatus according to another embodiment of the present invention.

Referring to FIG. 6, there is shown a third embodiment of the present invention. This embodiment is substantially similar to the first embodiment of FIG. 1 except a traction control unit and a yaw moment control unit 69 are respectively installed.

The yaw moment control unit 69 receives wheel speed signals from the wheel speed sensor 13FL~13RR, yaw rate from the yaw rate sensor 44 and angular positioning of steering wheel from the angular sensor 46. The yaw moment control unit 69 calculates a desirable wheel cylinder pressure in the same way explained in the first embodiment, and outputs increase and decrease signals to the braking force control apparatus.

The traction control unit 49 receives wheel speed signals from the wheel speed sensor 13FL~13RR and ON-OFF signal from the selectable switch. The traction control unit 49 calculates the desirable engine torque to restrain the driving wheel slip, and only if the traction control unit judges that the selectable switch is ON, outputs the driving force reduction request signals to an engine control module 59.

An engine control module 59 receives driving force reduction request signals from the traction control unit, and performs a fuel cutoff control so that fuel supply is cut off to a predetermined number of engine cylinders determined in accordance with a required reduction of the vehicle driving torque. The engine control module 59 can perform the fuel cutoff control by stopping the output of the fuel injection pulse signal or signals to one or more engine cylinders.

The yaw moment control unit 69 also outputs a signal whether it is outputting the increase and decrease signals to the braking force control apparatus or not to the traction control unit. If the yaw moment control unit 69 outputs the signal to the traction control unit, the traction control unit 49, outputs the driving force reduction request signals to an engine control module 59 according to the calculated desirable engine torque irrespective of selectable switch.

According to the present invention, when the yaw moment control is exerting, the engine control module can perform a fuel cutoff control so that fuel supply is cut off to a predetermined number of engine cylinders determined in accordance with a required reduction of the vehicle driving torque even if the selectable switch is OFF. As a consequence, the control apparatus only has to apply the least breaking force on the driving wheels.

Figure 7:
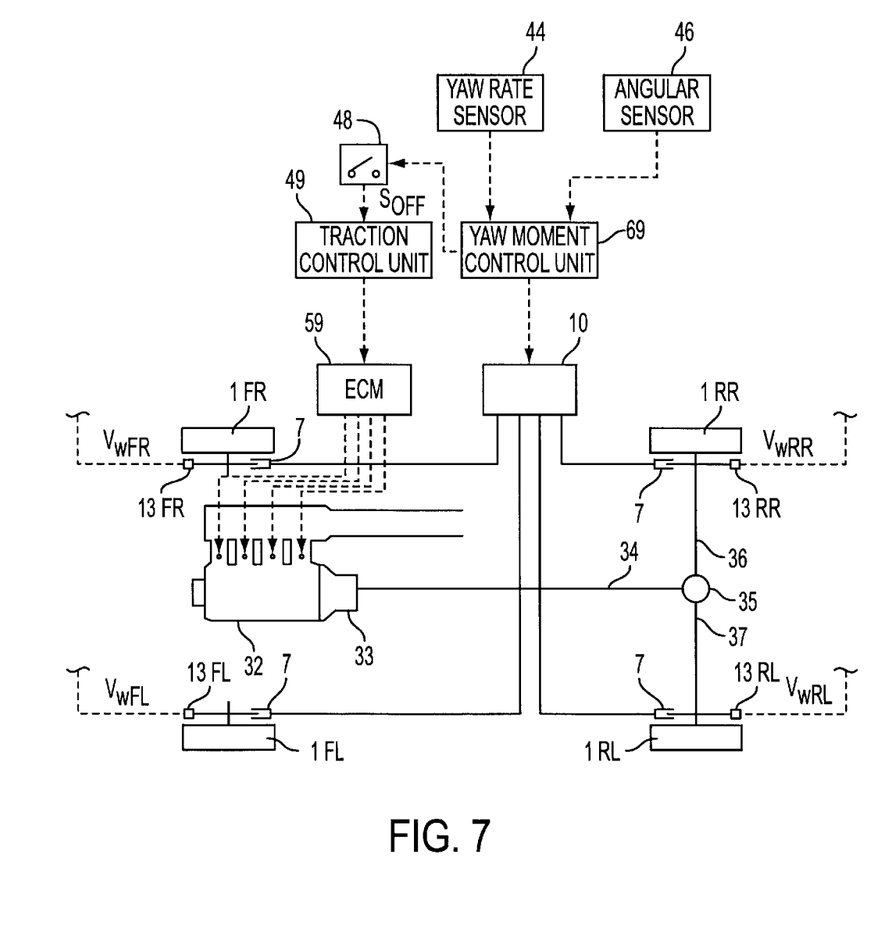
FIG. 7 is a schematic view showing a vehicle equipped with a traction control apparatus and a yaw moment control apparatus according to another embodiment of the present invention.

Referring to FIG. 7, there is shown a fourth embodiment of the present invention. This embodiment is substantially similar to the first embodiment of FIG. 6 except a yaw moment control unit is 69 connected to the selectable switch 48. The yaw moment control unit 69 compulsory sets the selectable switch as ON when it is exerting the yaw moment control.

According to the present invention, when the yaw moment control 69 is exerting, the engine control module can perform a fuel cutoff control so that fuel supply is cut off to a predetermined number of engine cylinders determined in accordance with a required reduction of the vehicle driving torque because the selectable switch is compulsory changed ON even if selected OFF.

Although both of the first and second above embodiments have been described where the second throttle valve decreases the engine power as the traction control apparatus, it is understood that the invention can be used with other types of the traction control system. For example, the invention is applicable to the fuel cutting off system and the brakes to the driving wheels.

Although the embodiments have been described in which the desirable yaw rate ψ* was computed for control processing based on vehicle velocity Vc and angular position θ of steering wheel, it is understood that the lateral acceleration sensor can be applied to vehicle velocity Vc and angular θ of steering wheel to compute the desirable yaw rate. Moreover, it is understood that desirable yaw rate can be computed based on regular yaw rate.

Although the embodiments have been described for a desirable yaw rate computed for control processing based on equation (2) and equation (3), it is understood that the control unit can be programmed to store a map that provides the relationship between angular θ of steering wheel which has parameters of vehicle velocity Vc.

Although the embodiments have been described for the wheel cylinder pressure directly detected under exerting yaw moment control, it is understood that the wheel cylinder pressure may be determined by computing.

Furthermore, although the embodiments have been described for a rear-drive type automotive vehicle, it is understood that this invention can be applicable also to a front-wheel drive vehicle or a four-wheel drive vehicle.

What is claimed is:

1. A vehicle stability control apparatus for a vehicle having drive wheels driven by an engine and driven wheels, the apparatus comprising:

a wheel speed sensor to detect wheel speed of the respective drive wheels and driven wheels;

a yaw rate sensor to detect yaw rate of the vehicle;

an engine power control apparatus to control output power of the engine to restrain a slip of the drive wheels in response to a first control signal;

a braking force applying apparatus to apply braking force to at least the driving wheels to control a yaw moment of the vehicle in response to a second control signal;

a selectable switch that produces an activation signal and an inhibition signal according to a selection by a driver; and a control unit operatively coupled with said wheel speed sensor, said yaw rate sensor, said engine power control apparatus, said braking force applying apparatus, and said selectable switch, wherein said control unit calculates a vehicle velocity in response to at least the driven wheels speed detected by said wheel speed sensor;

said control unit calculates the slip of the drive wheels in response to the drive wheels speed and the vehicle velocity;

said control unit applies the first control signal to said power source control apparatus to decrease the output power according to the slip of the drive wheels when said selectable switch produces the activation signal, and stops applying the first control signal to said power source control apparatus when said selectable switch produces the inhibition signal;

said control unit calculates the braking force to generate the yaw moment according to the yaw rate;

said control unit applies the second control signal to said braking force applying apparatus according to the braking force; and said control unit applies said first control signal to the engine power control apparatus irrespective of a state of the selectable switch when the second signal is applied to said braking force applying apparatus.

2. A vehicle stability control apparatus as claimed in claim 1, wherein the control unit calculates a slip quantity of the drive wheels in response to the drive wheels speed and the vehicle velocity;

the control unit continuously applies said first control signal until the slip quantity becomes under a predetermined value when the control unit applies first control signal irrespective of a state of the selectable switch.

3. A vehicle stability control apparatus as claimed in claim 1, further comprising an angular sensor to detect angular positioning of steering wheel;

wherein said control unit calculates a yaw rate which is less then the yaw rate which causes the vehicle to skid, according to the angular positioning and vehicle velocity; and said control unit calculates the braking force to generate the yaw moment according to the yaw rate and the aforesaid control unit calculated yaw rate.

4. A vehicle stability control apparatus as claimed in claim 1, wherein said control unit calculates a slip quantity of the drive wheels according to the drive wheels speed and vehicle velocity, and said engine power control apparatus comprises a second throttle valve disposed in series to a first throttle valve in an intake passage for the engine; an actuating system to actuate said second throttle valve according to the first control signal.

5. A vehicle stability control apparatus as claimed in claim 1, wherein said control unit calculates a slip quantity of the drive wheels according to the drive wheels speed and vehicle velocity, and said engine power control apparatus comprises a fuel cutoff control apparatus for cutting off a fuel supply to a part of cylinders of the engine and controlling a fuel cut cylinder number according to the slip quantity.

6. A vehicle stability control apparatus for a vehicle having drive wheels driven by an engine and driven wheels, the apparatus comprising:

a wheel speed sensor to detect wheel speed of the respective drive wheels and driven wheels;

an engine power source control apparatus to control output power of the engine in response to a first control signal;

a selectable switch for switching the engine power control apparatus on and off according to a selection by a drive;

a traction control unit operatively coupled with said wheel speed sensor and said engine power control apparatus;

said traction control unit being configured to calculate a vehicle velocity in response to at least the driven wheels speed detected by said wheel speed sensor;

said traction control unit being configured to calculate a slip of the drive wheels in response to the drive wheels speed and the vehicle velocity;

said traction control unit being configured to apply a first control signal to said power source control apparatus to decrease the output power according to the slip of the drive wheels when said selectable switch is on, and stops applying the first control signal to said power source control apparatus when said selectable switch is off;

a yaw rate detector to detect yaw rate of the vehicle;

a braking force applying apparatus to apply braking force to at least the driving wheels in response to a second control signal;

a yaw moment control unit operatively coupled with said wheel speed sensor, said yaw rate detector and said braking force applying apparatus;

said yaw moment control unit being configured to calculate the braking force to generate yaw moment according to the yaw rate;

said yaw moment control unit being configured to apply the second control signal to said braking force applying apparatus according to the braking force;

said traction control unit being configured to apply said first control signal to the engine power control apparatus irrespective of a state of the selectable switch when the second signal is applied to said braking force applying apparatus.

* * * * *